Figure 1:
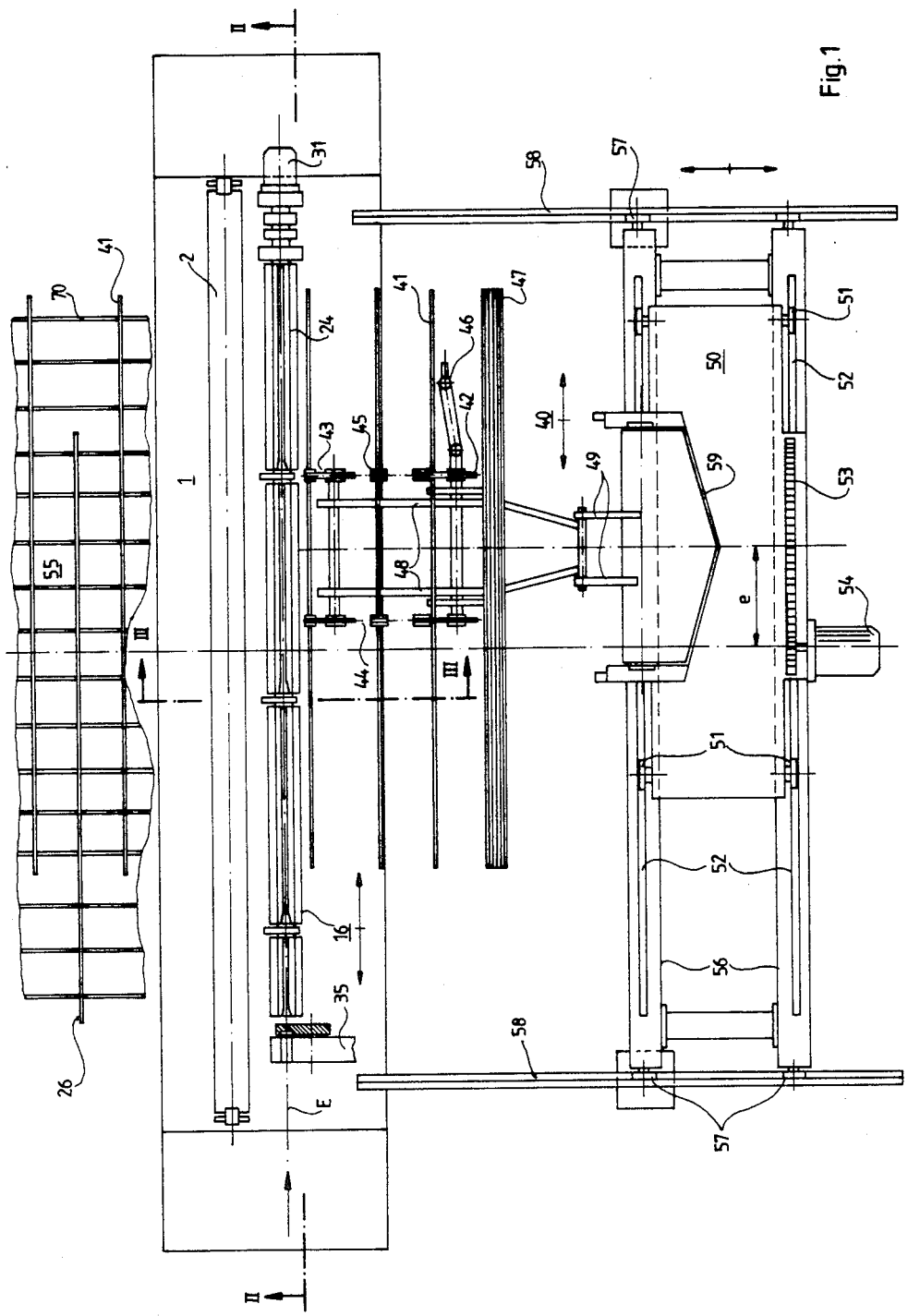

United States Patent [19]

Ritter et al.

[11] Patent Number: 4,748,309
[45] Date of Patent: May 31, 1988

[54] MULTI-SPOT RESISTANCE-WELDING MACHINE

[75] Inventors: Josef Ritter; Gerhard Ritter; Klaus Ritter; Rudolf Scherr, all of Graz, Austria

[73] Assignee: EVG Entwicklungs-U. Verwertungs-Gesellschaft m.b.H., Graz, Austria

[21] Appl. No.: 21,197

[22] Filed: Mar. 3, 1987

[30] Foreign Application Priority Data

Apr. 2, 1986 [AT] Austria .................................. 859/86

[51] Int. Cl.[4] ........................ B23K 11/02; B23K 11/32
[52] U.S. Cl. ......................................... 219/56; 219/87
[58] Field of Search .................... 219/56, 57, 58, 86.7, 219/86.25, 80, 87

[56] References Cited

U.S. PATENT DOCUMENTS

| | | | |
|---|---|---|---|
| 2,422,829 | 6/1947 | Fotie | 219/56 |
| 2,957,070 | 10/1960 | Schachter et al. | 219/56 |
| 3,597,568 | 8/1971 | Rach | 219/56 |
| 4,539,457 | 9/1985 | Pinger et al. | 219/58 |

FOREIGN PATENT DOCUMENTS

| | | | |
|---|---|---|---|
| 267292 | 12/1968 | Austria . | |
| 0837668 | 6/1981 | U.S.S.R. | 219/86.25 |
| 0979060 | 12/1982 | U.S.S.R. | 219/86.24 |

Primary Examiner—E. A. Goldberg
Assistant Examiner—Catherine M. Sigda
Attorney, Agent, or Firm—Marmorek, Guttman & Rubenstein

[57] ABSTRACT

A multi-spot resistance-welding machine for manufacturing welded grids consisting of a group of longitudinal wires and crosswires crossing the longitudinal wires at right-angles, to enable grids to be manufactured in which the length of at least some of the crosswires is smaller than the width of the grid and in which the relative position of these shorter crosswires can be selected with respect to the group of longitudinal wires, is equipped with two crosswire feed devices (16, 40) of which at least one, but preferably both, can be displaced and fixed in an allocated guide (15, 17; 51, 52) transversely to the feed path of the group (70) of longitudinal wires and relative to a delivery device (60) transferring the crosswires from the feed devices into the welding area.

7 Claims, 4 Drawing Sheets

MULTI-SPOT RESISTANCE-WELDING MACHINE

The invention relates to a multi-spot resistance-welding machine for manufacturing grids which consist of longitudinal and crosswires which cross one another at right-angles and are welded to one another at the points of intersection, having two feed devices for the crosswires and a delivery device which removes the crosswires individually from the feed devices and transfers them into the welding area between the electrodes.

A machine of this type is known for example from the Austrian Patent Specification No. 267,292. In the known machine, the crosswires are injected from the side in guides arranged at a distance in front of the welding electrodes, then they are lifted out of the injection guides by transfer rails provided with appropriately shaped hooks and delivered by these rails into the area between two double-spot welding sections in welding-electrode rows forming in the direction of the longitudinal wires. Thus two crosswires of the same length are in each case injected simultaneously and also welded simultaneously to the group of longitudinal wires, which is why such a machine permits very high production rates, but on the other hand is restricted to the production of grid strips in which the crosswires extend over the entire width of the grid. However, grids are often called for in which this is not the case and, for example on both sides of the longitudinal centre axis of a grid mat, twice as many crosswires are to be provided on each third of the mat width as along the two mat edge regions amounting to one-sixth of the mat width, or grids in which, over a large part of the mat width, as viewed from one grid edge region, twice as many crosswires are to be provided as on the opposite edge region of the mat.

It is therefore the object of the invention to develop a grid-welding machine of the generic type specified in the introduction, that is a machine having two feed devices for crosswires, in such a way that, by using this machine, crosswires of different lengths can be arranged in one and the same grid strip and that all crosswires whose length is shorter than the overall width of the grid strip can be arranged in any position with respect to the longitudinal centre axis of this grid strip.

This object is achieved in that at least one of the two feed devices for the crosswires is designed such that it can be displaced and fixed in a guide transversely to the feed path of the group of longitudinal wires and relative to the delivery device transferring the crosswires into the welding area.

Moreover, the crosswires of different length can be removed, as known per se, from separate magazines and moved by the allocated feed devices into the effective area of the delivery device transferring them to the welding area, or straightened wires can be pushed in, as also known per se, from one side of the machine in guides interacting with the delivery device and cut into crosswires of desired length as required. These two types of cross-wire feed devices can also be combined with one another. A lateral wire feed is preferably used for the or for each transversely adjustable feed device, with shears being mounted on the feed device at its entrance, which shears execute a program-controlled shearing cut after a desired wire section has been fed in program-controlled manner in the feed device, so that the feed device assuming a certain nominal position in the transverse direction is in each case loaded with a crosswire of desired length in the desired relative position with respect to the feed path of the group of longitudinal wires.

Figure 2:
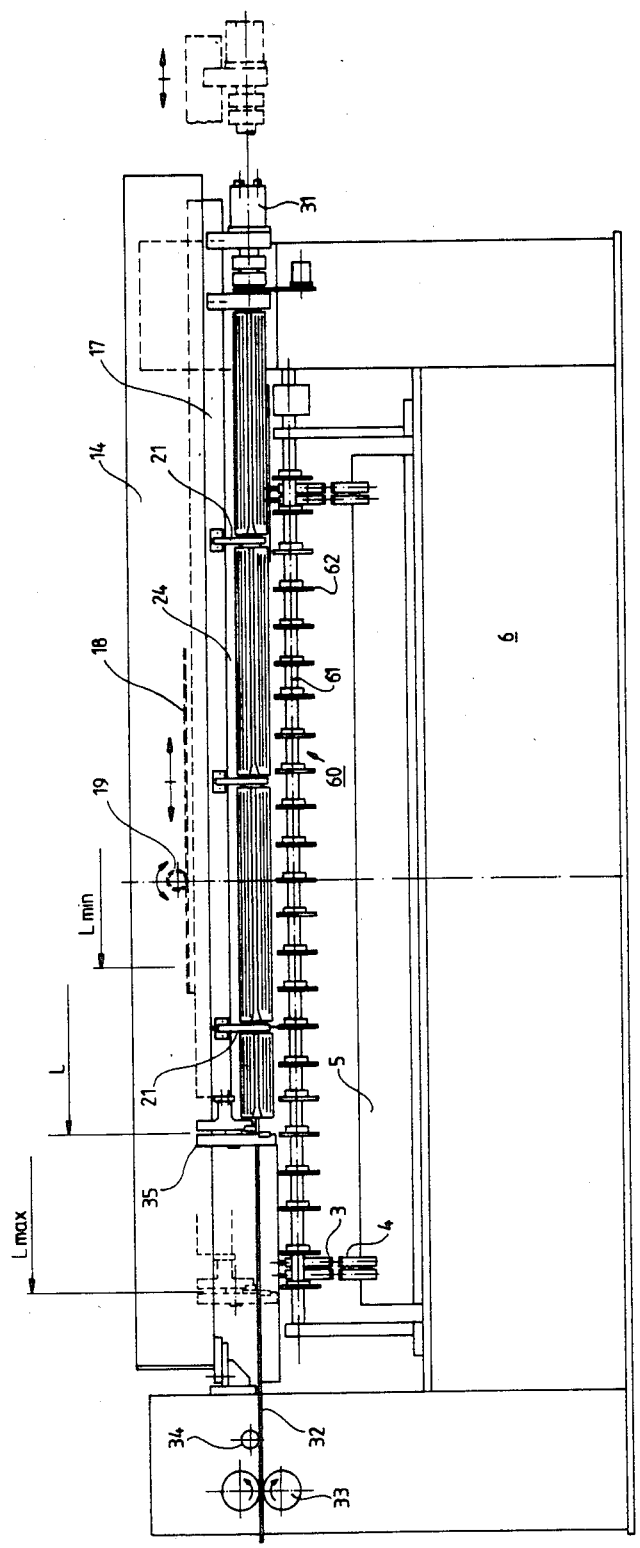

A simple embodiment of a grid-welding machine according to the invention having only one row of electrodes is described in greater detail with reference to the drawings. FIG. 1 shows a plan view of the welding machine, FIG. 2 shows a section along line II—II in FIG. 1, FIG. 3 shows a section along line III—III in FIG. 1, and FIG. 4 shows to a larger scale the important parts which can be seen in FIG. 3.

Figure 3:
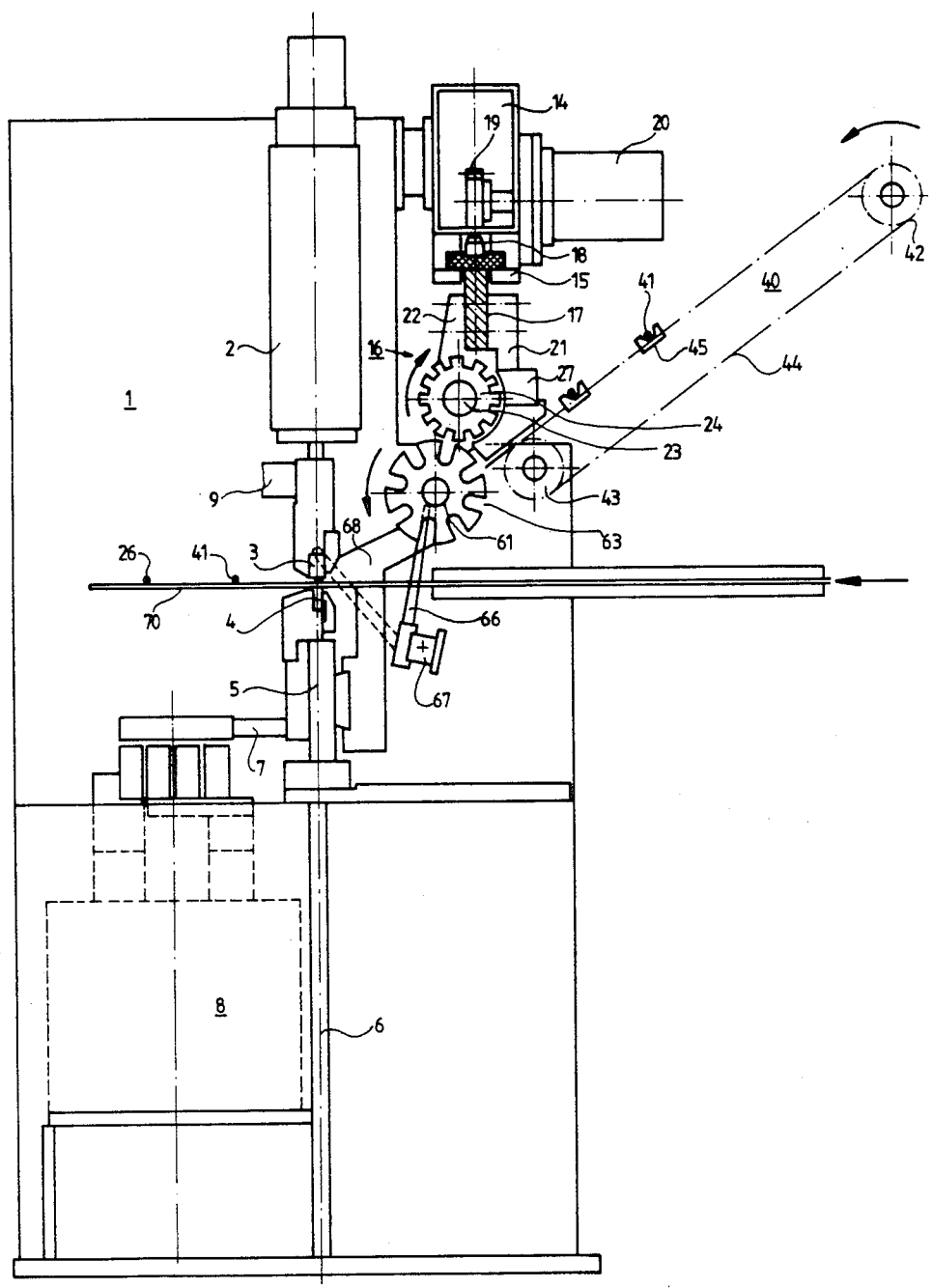
Figure 4:
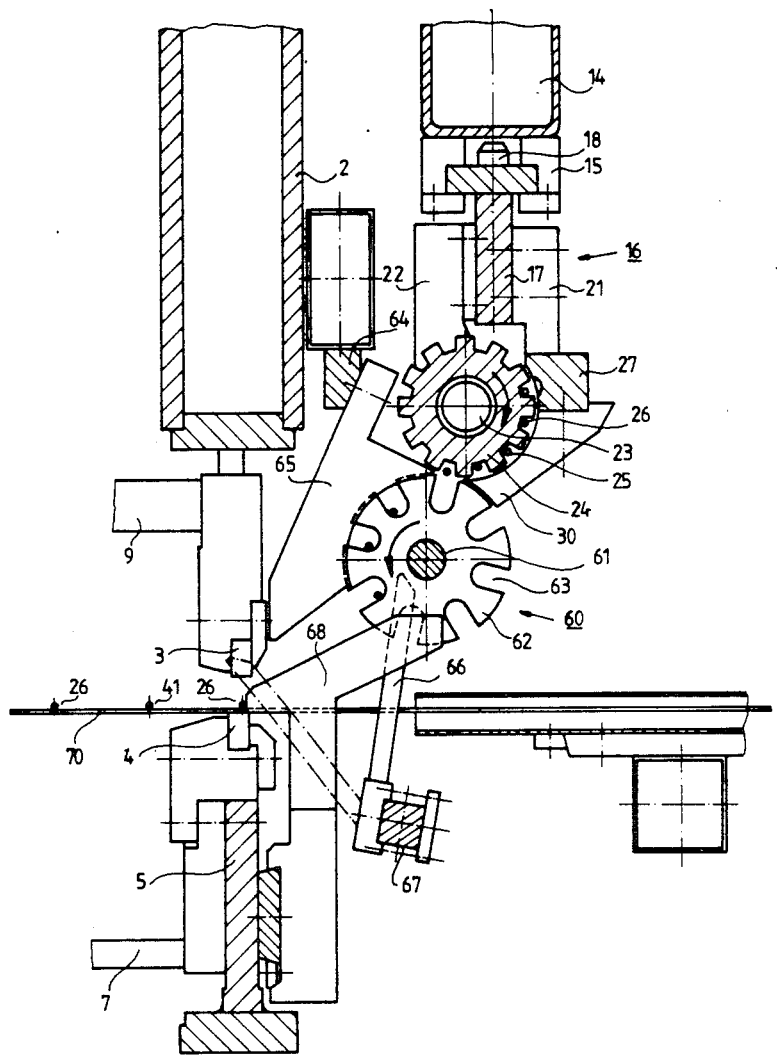

In FIGS. 1 and 3, the electrode beam 2 which carries the upper electrodes 3 can be seen on the welding machine 1. The electrode beam 2 can be moved up and down and the electrodes 3 can be supported in it in springloaded manner, or it can be of a fixed design and carry on the inside working cylinders, for example hydraulic working cylinders, which set the electrodes to the work to be welded and lift again from the latter. The lower electrodes 4 are supported on a bearer 5 which is fixed to the machine and rests on a wall 6 which runs across the entire width of the machine housing and absorbs the welding pressure from the bearer 5.

The lower electrodes 4, of opposite alternating polarity, are connected in known manner to the secondary coils of transformers 8 via flexible supply lines 7. The upper electrodes 3 are connected in known manner via flexible supply lines 9 to an equalizing conductor (not shown), which preferably extends over the entire width of the machine, and form the passive electrodes of double-spot welding sections orientated across the width of the machine.

However, the described arrangement and electrical feed of the electrodes is only one exemplary embodiment which does not limit the applicability of the invention. Every other conventional and expedient type of electrode arrangement and their energy supply, in particular while forming single-spot welding sections, can of course be applied within the scope of the invention.

A beam 14 (FIGS. 3 and 4) which is fixed in the machine housing at its two ends and extends over the entire width of the machine supports a first cross-wire feed device 16 in a guide 15. This feed device 16 is suspended in the guide 15 by means of a second beam 17 which is T-shaped in cross-section and, at its upper side, is connected to a toothed rack 18. The pinion 19 of an electric motor 20, which is arranged on the beam 14, reaches through an opening in the base of the beam 14 and meshes with the toothed rack 18. By means of the motor 20 and the pinion 19 engaging in the toothed rack 18, the beam 17, together with the entire cross-wire feed device 16 in the guide 15, can be displaced forward and backward as viewed in FIGS. 3 and 4 or to the right and left as viewed in FIGS. 1 and 2. This displacement preferably takes place under the control action of a program-control device which does not form the subject matter of the invention and is therefore not shown.

The limits of displacement are indicated in FIG. 2 by the arrows $L_{max}$ and $L_{min}$. The latter limit in particular is determined by the arrangement of the pinion 19 on the beam 14. In FIG. 2, it has been assumed that this pinion 19 is arranged in the centre of the machine; but it could just as easily be arranged excentrically, for example shifted in FIG. 2 in the direction of the lateral limit of the machine, as a result of which $L_{min}$ would likewise be shifted further to the right.

Connecting pieces 21 spaced along the beam 17 support a bearer 27 (FIGS. 3 and 4) along which guide ribs 30 are fixed which are arranged at closer distances from one another. Further connecting pieces 22 are arranged opposite the connecting pieces 21 along the beam 17, on the lower ends of which connecting pieces 22 a shaft 23 is mounted which, at its sections located between the connecting pieces 22, is surrounded by rollers 24 which are connected non-rotationally to the shaft 23. Each roller 24 is provided with grooves 25 which are parallel to the axis, are arranged at equal angular distances along the periphery of the roller, and are used for receiving grid crosswires 26. The spaced guide ribs 30 close the grooves 25 underneath to prevent the crosswires from undesirably falling out of the grooves prematurely.

A motor 31 (FIG. 1) is arranged on one end of the beam 17, which motor 31 is connected non-rotationally to the shaft 23 and, in programmed control, as soon as a crosswire 26 is to be removed from one of the grooves 25, turns the shaft 23 further by one step in accordance with the angular distance between two adjacent grooves along the roller periphery. A straight wire 32 is inserted into an upper groove 25 of the roller 24 from the machine side opposite the motor 31 along line E in FIG. 1. For feeding the wire 32, program-controlled feed rollers 33 which can be driven in rotation and grip the wire in a clamped connection, and also a measuring roller 34 which signals the feed distance covered by the wire to the control device are provided on the machine housing according to FIG. 2. By shears 35 arranged in the feed path of the wire, a crosswire 26 of desired length can in each case be cut off from the wire 32 being fed in. Like the motor 31, the shears 35 are arranged on the beam 17 such that they can be moved along with the latter.

In the above-mentioned program-control and computer unit (not shown), the position of the first crosswire feed device 16 signalled by a transmitter coupled to the pinion 19 is compared with the desired crosswire length retained in an input unit, and from this the required feed distance of the wire 32 is determined so that, for example, in FIG. 2 to the right of the shears 35, a crosswire 26 of desired length comes to lie in each of the grooves 25.

A second cross-wire feed device 40 is loaded with straightened crosswires 41 all cut to the same length. The feed device 40 can have the construction known from the Austrian Patent Specification No. 368,414. In the present context, therefore, this feed device 40, with reference to the schematic representation in FIGS. 3 and 4, need only be described to the extent necessary for understanding the invention. Accordingly, the second feed device 40 essentially consists of endless link chains 44 which are looped around chain wheels 42 and 43 and carry mutually spaced receptacles 45 for the crosswires 41. These crosswires 41 are inserted individually in known manner, for example from a magazine 47 (only indicated schematically), into the receptacles 45 close to the upper chain wheels 41, driven in program-controlled manner via a universal-joint shaft 46, and fed by means of the link chains 44 to a delivery device 60 which alternatively receives crosswires 26 or 41, generally of different length and different relative position with respect to the feed path of the group of longitudinal wires, from the first feed device 16 or from the second feed device 40.

The spindles of the chain wheels 42 and 43 of the feed device 40, the wire magazine 47 and the device (not shown because known per se) for transferring individual wires from the magazine 47 into the receptacles 45 are supported by two bearers 48. The bearers 48 are mounted by means of a linkage 49 on a trolley 50 which can be displaced transversely to the welding machine on rails 52 by means of rollers 51. This displacement, which serves for positioning the cut-to-length crosswires 41 in the desired position within the grid 55 to be made, for example in a position shifted sideways by a distance e relative to the longitudinal centre axis of the grid 55, is effected by means of an electric motor 54 which is program-controlled if necessary and interacts with a toothed rack 53. A platform 56 which supports the cross rails 52 and on which a receptacle 59 is also arranged for a wire supply feeding the magazine 47 can be displaced on longitudinal rails 58 toward the feed device 16 or away from it by means of rollers 57. But this displaceability simply serves to facilitate any necessary maintenance work on the two feed devices 16 and 40.

A non-displaceably arranged delivery device 60 extends transversely across the width of the welding machine. The delivery device 60 consists of a shaft 61 which can be driven in the welding cycle of the machine and along which discs 62 are arranged at intervals. Along their peripheries, the discs 62 have slots 63, at equal angular distances and in rows parallel to the shaft 61, for receiving in each case one crosswire, namely either a crosswire 26 from the feed device 16 or a crosswire 41 from the feed device 40. By programmed control, a crosswire 26 or a crosswire 41 is selected for delivery into one of the slots 63 by means of the drive of the shaft 23 or the link chains 44.

Cover plates 65 which prevent the crosswires from falling out of the slots 63 prematurely are provided at intervals along a bearer 64. Spaced fingers 66 which reach into the intermediate spaces between the discs 62 are arranged on a beam 67, extending transversely across the width of the machine and rotatable about its axis, and by means of a pivoting movement in the welding machine cycle deliver the wires from the lowermost slot 63 along guides 68 into the area between the welding electrodes 3 and 4 and deposit them there onto the longitudinal wires 70.

In the working cycle of the welding machine, that is after every welding operation, the shaft 61 is indexed further by an angular amount which is equal to the sector angle between two adjacent slots 63.

If during a welding operation, each time the shaft 61 is stopped, the shaft 23 is likewise turned further by one step which is equal to the angular distance between two adjacent grooves 25 along the roller 24, a crosswire 26 passes during each of these rotational motions from the lowermost groove of the rollers 24, which groove is no longer covered by the guide gibs 30, into a row of free slots 63 and the welding machine is loaded exclusively with wires from the feed device 16.

In the same way, the welding machine can be loaded exclusively with cut-to-length crosswires 41 from the feed device 40 if, each time the shaft 61 is stopped, the link chains 44 are moved further by one step which is equal to the distance between two consecutive receptacles 45 and thus in each case transfer a crosswire 41 from the lowermost receptacle 45 to the slots 63 in the discs 62.

Moreover, grids can also be produced, for example, in which rods 26 and 41 are arranged in constantly alternated manner. In this case, the shaft 23 and the link chains 44 are simultaneously indexed further by one step after every second index step of the shaft 61 and transfer in each case a crosswire into one of two adjacent rows of slots 63. In addition, wires can be transferred from the feed devices 16 and 40 to the delivery device 60 in any sequence by a program-control device.

Moreover, the length of the crosswires 26 fed in each case to the feed device 16 and cut to length by the shears 35 from the wire 32 being fed can be determined in each individual case by the program-control device in the same way as the particular position of the feed devices 16 and 40 with respect to the welding machine axis.

As a result of this embodiment of the machine, the machine can produce grids whose crosswires, within one and the same grid strip, differ not only in their length but also in their position with respect to the longitudinal centre axis of the grid strip.

The exemplary embodiment described permits various modifications within the scope of the invention. Thus the invention can also be used in grid-welding machines which, like the machine according to the Austrian Patent Specification No. 267,292 cited in the introduction, have two parallel rows of welding electrodes. Two allocated crosswires of selectable, different length are then in each case delivered simultaneously by means of transfer rails to these two rows of electrodes, which within the scope of the invention expediently do not form double-spot but single-spot welding sections, with at least one of the crosswires being fed in program-controlled manner to the transfer rails via a feed device which can be displaced across the feed path of the group of longitudinal wires and is supplied with a wire which is to be cut to length either from the side, similar to the feed device 16 described, or from a magazine in the direction of the longitudinal wires, similar to the feed device 40 described. Apart from the examples described, there are also numerous other pos ibilities with respect to the design of the feed devices and the delivery device.

We claim:

1. A multi-spot resistance-welding machine for manufacturing grids in which longitudinal and crosswires cross one another at right-angles and are welded to one another at points of intersection, said machine comprising two feed devices for said crosswires, two welding electrodes defining a welding area therebetween, a delivery device operable to take said crosswires from said feed devices and transfer them into said welding area, and a guide for at least one feed device, said one feed device being operable to be displaced and positioned in said guide transversely to a feed path of said longitudinal wires and relative to said delivery device transferring said crosswires into said welding area.

2. A welding machine according to claim 1, wherein said feed devices produce said crosswires from a supply wire and at least one of said two feed devices comprises receiving members operable to be displaced transversely to said feed path of said longitudinal wires and are in alignment with one another, for said supply wire, and further comprising means for feeding said supply wire in a program-controlled manner, shears mounted on an entrance side of said one feed device for cutting off from said supply wire a crosswire of desired length in the program-controlled manner, and means for feeding said crosswire in the program-controlled manner to said delivery device.

3. A welding machine according to claim 1, further comprising a magazine for holding cut-to-length crosswires and wherein at least one of said two feed devices comprises a member operable to be displaced transversely to said feed path of said longitudinal wires, and to receive said cut-to-length crosswires from said magazine in the direction of said longitudinal wires; and means for feeding said cut-to-length crosswires from said member in a program-controlled manner to said delivery device.

4. A welding machine according to claim 2, further comprising a bearer mounted in transversely displaceable manner, said one feed device comprising a row of rollers non-displaceably but rotatably mounted on said bearer, aligned grooves being provided along peripheries of said rollers parallel to the axis thereof for receiving individual ones of said crosswires; feed rollers operable to interact with said one feed device, and operable to remove a wire from a wire supply and to push a front end of said wire into one of said grooves of said rollers; a measuring device operable for measuring the length of said fed wire and also, next to an entry end of the grooves, shears, arranged on said bearer, and operable to cut off from a following wire a wire section which has been pushed into said groove.

5. A welding machine according to claim 3, wherein said one feed device has at least two parallel link chains with receptacles, arranged at intervals, along said link chains, and operable to receive said cut-to-length crosswires individually removed from said magazine and to transfer said cut-to-length crosswires to said delivery device.

6. A welding machine according to claim 1, further comprising a row of said welding electrodes and wherein said delivery device comprises a shaft operable to be driven intermittently in rotation in a welding cycle and parallel spaced discs connected non-rotationally to said shaft, said discs having, along peripheries thereof, slots equispaced in rows parallel to said shaft, for the program-controlled reception of one of said crosswires from one of said two feed devices and being operable to deliver said crosswires in cycles into a position adjacent to said row of said welding electrodes.

7. A welding machine according to claim 4, further comprising removing devices operable for removing each of said crosswires from said delivery device when said crosswire has reached a position adjacent to said welding electrodes and for guiding said crosswire into said welding area.

* * * * *